3,017,827
AQUEOUS COATING COMPOSITION COMPRISING WATER SOLUBLE POLYETHYLENEPOLYAMINE-DIHALOALKANE UREA-FORMALDEHYDE REACTION PRODUCT AND PLANOGRAPHIC PAPER BASE FORMED WITH SAME
George S. McKnight, Jr., Rumford, and Glenn Harold Perkins, Mexico, Maine, assignors to Oxford Paper Company, Rumford, Maine, a corporation of Maine
No Drawing. Filed Aug. 29, 1957, Ser. No. 680,926
16 Claims. (Cl. 101—149.2)

This invention relates to improved coating compositions useful in making planographic printing plates. More particularly, the invention relates to a coating composition comprising a pigment and a reaction product formed by cross-linking a water soluble polyethylenepolyamine-dihaloalkane-urea-formaldehyde thermosetting resinous compositions with a starch or cellulosic derivative containing reactive hydroxyl groups. The invention also includes novel, improved printing plates embodying the improved coating compositions of this invention.

Printing plates and especially planographic printing plates have been made by applying various coating compositions to a suitable base. Paper base printing plates have heretofore been used due to their low cost and also because they can be typed upon using special ribbon and also written upon with special pencils or ball point pens. Paper offset printing plates are presently made from wet strength base stock coated with a suitable water resistant barrier to which the planographic coating is applied. Many difficulties have been experienced in the past with paper base planographic printing plates. For example, it has been found that the planographic coatings used on the paper base which accept grease and ink satisfactorily are too easily penetrated by water or the fountain solution and consequently "tone up" quickly giving the plate a short life and unsatisfactory printing characteristics. Prior planographic printing plates have also been found to have poor aging properties due to deterioration of the planographic surface coating and exposure of the plate surfaces to high humidity. Under press operating conditions, when the press is shut down for several minutes for minor adjustments or masking of the plate and restarted, clean first copies are difficult to obtain.

The novel coating compositions and printing plates of this invention obviate these disadvantages and result in printing plates which have properties superior to other known paper base planographic printing plates. The improved coating compositions and printing plates of this invention exhibit no sensitivity or toning of the planographic surface of the plate under storage conditions or high temperature and humidity. Under press operating conditions the press can be shut down for minor adjustments or for masking of the plates and a clean first copy is obtained when the press is restarted. The paper and fabric image life of the printing plates prepared according to this invention are superior to other paper base printing plates. Also the first copy produced by these plates is superior to the first copies produced by other paper base printing plates, and they will produce over 1,000 clear, legible copies.

The coating compositions of this invention essentially comprise an adhesive or a hydrophilic colloid, a pigment, and a thermosetting resin capable of cross-linking with the adhesive or hydrophilic colloid.

The adhesives or hydrophilic colloids which can be used according to this invention include starch, cellulose, and derivatives of starch and cellulose, that contain reactive hydroxyl groups. Some specific examples of adhesives which can be used include various starches and starch derivatives, such as corn starch, amioca starch, starch ethers, chlorinated starch and the like; water soluble cellulose gums, such as sodium carboxymethyl cellulose; and natural gums such as alginates. Sodium carboxymethyl cellulose, chlorinated starches and amioca starches have been found to be particularly advantageous. Various grades of sodium carboxymethyl cellulose can be used as long as the sodium carboxymethyl groups introduced into the cellulose molecule are in a sufficient number to bring about solubility in water. The grade of sodium carboxymethyl cellulose varies depending upon the degree of substitution of the sodium carboxymethyl groups and the viscosity. Different grades can be used for the purposes of this invention, and we have found that a low viscosity carboxymethyl cellulose marketed by the Hercules Powder Company under the trade name Hercules CMC-70 is particularly advantageous.

The water soluble thermosetting resinous compositions which can be used according to the present invention are described in United States Patent No. 2,616,874 issued to Yost and Autin on November 4, 1952. These nitrogenous resinous compositions are water soluble and are polyethylenepolyamine-dihaloalkane-urea - formaldehyde reaction products. The resins are prepared by reacting the polyethylenepolyamine having a molecular weight of at least 146 in solution with a dihaloalkane of 2 to 3 carbon atoms to form a soluble reaction product. This soluble reaction product is then subsequently condensed with urea and the resulting condensate reacted in solution with formaldehyde within prescribed proportions.

Various polyethylenepolyamine and dihaloalkanes can be used to form these resinous compositions as is fully disclosed in the Yost and Autin patent. We have found that triethylenetetramine is an advantageous polyethylenepolyamine and also that ethylene dichloride is an advantageous dihaloalkane. The following example illustrates the method of preparing an advantageous cross-linking thermosetting resin which can be used according to the present invention. Parts are by weight.

EXAMPLE 1

1945 parts of triethylenetetramine were mixed with 264 parts of water and heated to 100° C. 1322 parts of ethylene dichloride were then added to the mixture while maintaining the temperature between 100° and 110° C. This reaction mixture was heated at 120° C. until the viscosity of a sample diluted with water to an amount one-third of the weight of the sample had a Gardner-Holdt viscosity between Q to R at 25° C. This reaction mixture was then cooled to about 100° C. and 2120 parts of a 50 percent sodium hydroxide aqueous solution were added. This mixture was cooled to 70° C. and an additional 750 parts of ethylene dichloride added. This mixture was then heated to refluxing temperature with the temperature rising over a period of 2 hours to 112° C. This mixture was heated until the viscosity of a 10 gram sample diluted with 7.5 grams of water was about C on the Gardner-Holdt viscosity scale. The reaction mixture was diluted with 1110 parts of water, cooled to 70° C., and treated with 1210 parts of a 50 percent sodium hydroxide aqueous solution. 3490 parts of urea were then added to this solution and the resulting mixture heated under reflux. Ammonia was evolved during refluxing and the heating was continued until the viscosity of a sample from which sodium chloride crystals were removed was W on the Gardner-Holdt scale. Water was then distilled from the reaction mixture until 920 parts had been removed. 2140 parts of a 37 percent aqueous formaldehyde solution were then added to the remaining concentrate. The resulting resin solution contained 3200 total parts containing 38.4 percent total solids and 31.2 percent resin solids. The resin solution had a viscosity of A on the Gardner-Holdt scale.

In producing the cross-linking thermosetting resins used according to this invention and as is pointed out in the Yost and Autin patent, the dihaloalkane is preferably a dichloro or dibromo alkane of not over 3 carbon atoms. The polyethylenepolyamine should have a molecular weight of at least 146, and the mol ratio of the dihaloalkane to the polyethylene polyamine should be at least 0.7:1 and should not exceed about 1.6:1 and should also be capable of yielding a soluble condensate product. The reaction between the dihaloalkane and the polyethylenepolyamine is generally continued until a 60 to 65 percent aqueous solution of the condensate product has a Gardner-Holdt viscosity of N to $Z_3$ at 25° C. The ratio of the urea used to the —NH— groups of the nitrogenous condensation product is between 0.2:1 and 1.5:1. The urea is generally reacted with the soluble condensation product, resulting from the reaction of the dihaloalkane and the polyethylenepolyamine, at temperatures between 100° and 200° C. and until a 50 percent aqueous solution of the resulting product has a Gardner-Holdt viscosity of about B to M at 25° C. The amount of formaldehyde used to form the soluble resinous product used in accordance with this invention is at least 0.6 mol of formaldehyde for each hydrogen present on nitrogen in the dihaloalkane-polyethylenepolyamine-urea condensate.

Various pigments may be used to form the compositions of this invention such as clay, zinc oxide, calcium carbonate, diatomaceous earth, fuller's earth, satin white, calcium silicate, barium sulphate, and titanium dioxide. Coating clays, such as china clay, have been found to be particularly advantageous pigments, and the use of clay as a pigment results in an all-around improved printing plate when the composition is applied to a paper base. These advantageous results by using clay are also produced when it is used together with other pigments. The proportion of clay to other pigments can be varied over a wide range, but we have found that a mixture of between about 70–80 percent by weight of clay is advantageous.

It is also advantageous to use a catalyst in forming the compositions of this invention. Catalysts which can be used according to this invention include ammonium chloride, ammonium phosphate, zinc chloride, zinc acetate, zinc borate, hydrogen peroxide, ammonium dichromate, copper sulphate, and zinc chromate. Zinc chromate has been found to be advantageous since superior plate properties are obtained by its use.

The amount of catalyst used can be varied widely depending upon the particular catalyst employed. The amount which is utilized can be readily determined by those skilled in the art. To illustrate the widely varying amounts of catalysts which can be used depending upon the catalyst, we have found that the advantageous amount of ammonium chloride is 30 percent; of hydrogen peroxide, 20 percent; and with zinc chromate, 65 percent based on the weight of the solid water soluble thermosetting resin used as herein described.

The ratio of the water soluble thermosetting resin to the adhesive or hydrophilic colloid based on dry solids may also vary considerably depending upon various factors, such as the particular adhesive employed. We have found that when using sodium carboxymethyl cellulose the ratio of the water soluble thermosetting resin to the sodium carboxymethyl cellulose can be varied between about 20 and 100 percent and also that the range of between about 50 to 70 percent is particularly advantageous.

The ratio of the adhesive or hydrophilic colloid to the pigment based on dry weight will also vary depending upon the particular adhesive employed. However, we have found that a range of between about 15 and 100 percent adhesive is suitable and that it is advantageous when using sodium carboxymethyl cellulose as an adhesive to maintain the range between about 20 to 30 percent based on the dry weight of the pigment.

Within the above ranges given for the use of carboxymethyl cellulose with pigment and the use of the water soluble thermosetting resin with carboxymethyl cellulose, we have also found that it is advantageous to maintain the weight of the pigment between about 20 and 80 percent of the total weight of the composition, and that it is particularly advantageous to use about 60 percent by weight pigment based on the total weight of the composition.

When the aqueous coating composition is applied to the sheet it is a mixture and there appears to be no reaction between the resin and the adhesive. If the aqueous coating composition is dried at room temperature there is no indication of curing or cross-linking of the resin and the resulting dried composition is not insoluble to water. The factors influencing the curing of the resin are pH, temperature and time. Maintaining the pH at an appropriate level, as described below, and the introduction of a catalyst in the coating composition promote faster curing of the resin at lower temperatures. The temperature used to cure the resin and the time of curing will depend upon the type of catalyst and the amount used and the pH of the coating composition. We have found that when using a coating composition having a pH of about 5 and about 3 parts by weight of zinc chromate the curing temperature should be about 280° F. For example, when coating the composition of this invention to sheets at machine speeds of from 160 to 200 feet per minute, the coating composition can be continuously dried and cured at such speeds in about 25 seconds at a temperature of 280° F. Varying the components, catalyst pH, etc., will necessitate a variation in the curing or reaction temperatures used for best results.

The coating compositions of this invention are self-insolubilizing and the components react during the ordinary drying cycle resulting in a hard water-insoluble coating. The cross-linking reaction between the resin and adhesive produces a practically water impervious film or coating which possesses excellent properties of accepting and holding both water and greasy ink.

We have also found that it is advantageous to adjust the pH of the coating compositions to about 5 to effect faster curing; however, the pH can be lower than 5 and can also be as high as about 8.5 or higher with a longer curing cycle. If it is necessary to adjust the pH, this can be done with acetic acid or ammonium hydroxide, depending upon the direction of the adjustment. Other acids can be used and it is only necessary that the acid be compatible with the coating composition. When raising the pH by means of an alkali, it is advantageous to use a volatile alkali such as ammonium hydroxide.

The following examples illustrate the manner of producing the coating compositions according to this invention in more detail. Parts are by weight.

EXAMPLE 2

3 parts of sodium carboxymethyl cellulose marketed by the Hercules Powder Company under the trade name Hercules CMC–70 were mixed together with 1.8 parts of the water soluble resin produced in Example 1 on a dry weight basis together with 12 parts of china clay and 3 parts of zinc chromate. The water soluble resin used was in the form of an aqueous solution containing 30 percent resin solids. The pH was about 5. Additional water was then added to this composition to produce a flowable color. The amount of water generally used is sufficient to render the solids content between about 12 to 40 percent depending upon the method of application used in coating the paper base.

The resulting composition was then coated onto a wet strength base paper stock and heated to about 280° F. to dry and cure the coating. The drying and curing was accomplished at a machine speed of about 160 feet per minute. At this speed and temperature the coating composition was cured in about 25 seconds. The coating dried and cured during the ordinary drying cycle for the paper sufficiently to produce a hard, water-insoluble coating. The coating was then suitable for receiving an image and for producing copies of that image by offset printing. A greasy image was placed on the plate and more than 1,000 clear, legible copies of the image were produced by the offset printing process. The printing plate thus produced possessed all of the advantageous properties noted above.

EXAMPLE 3

20 parts of chlorinated (oxidized) corn starch, marketed under the trade name STAYCO C, by A. E. Staley Mfg. Co., were mixed together with 60 parts of Lustra Clay, 6 parts of an aqueous solution containing 30% resins solid produced in accordance with Example 1, 10 parts zinc acetate, 3 parts acetic acid and 150 parts of water.

The resultant composition was then coated onto a wet strength base paper stock and heated to about 280° F. to dry and cure the coating in the same manner as the coating of Example 2. A greasy image was then placed on the plate and more than 1,000 clear, legible copies of the image were produced by the offset printing process. The planographic surface produced clean copy, good image, and correction life, good toning and "stop-go" properties.

Similar plates can be prepared in accordance with the above example by substituting 10 parts of zinc sulfamate for the zinc acetate and acetic acid, together with 120 parts of water to produce a flowable color.

Similarly, 30 parts of the Lustra Clay in Example 1 can be substituted with 30 parts of colloidal silica and 2 parts of alum substituted for the zinc acetate and acetic acid. When these substitutions are made, a water content of 170 parts is desirable to produce a flowable color.

This is a continuation in part of our prior application Serial No. 610,630, filed September 18, 1956.

We claim:

1. An aqueous coating composition comprising an adhesive containing a reactive hydroxyl group comprising at least one member of the group consisting of a starch and a cellulose material, an inorganic pigment, and a water soluble polyethylenepolyamine-dihaloalkane-urea-formaldehyde reaction product.

2. The coating composition of claim 1 in which the pigment is clay.

3. The coating composition of claim 2 in which the adhesive is carboxymethyl cellulose.

4. The coating composition of claim 2 in which the adhesive is amioca starch.

5. The coating composition of claim 2 in which the adhesive is a chlorinated starch.

6. The coating composition of claim 3 in which the water soluble cross-linking resin is a reaction product of a polyethylenepolyamine having a molecular weight of at least 146 with a dihaloalkane of not over 3 carbon atoms urea and formaldehyde.

7. An aqueous coating composition comprising an adhesive containing a reactive hydroxyl group comprising at least one member of the group consisting of a starch and a cellulose, an inorganic pigment and a water soluble cross-linking resinous composition produced by reacting a dihaloalkane of not over 3 carbon atoms, said halogen being a member of the group consisting of chlorine and bromine, with a polyethylenepolyamine having a molecular weight of at least 146, the mol ratio of dihaloalkane to polyethylenepolyamine being at least 0.7:1 and not exceeding 1.6:1 and being capable of yielding soluble condensation products, and continuing the reaction until a 60 to 65 percent aqueous solution of the condensation product has a Gardner-Holdt viscosity of N to $Z_3$ at 25° C., reacting the resulting condensation product by heating it with urea until a 50 percent aqueous solution of the resulting reaction product has a Gardner-Holdt viscosity of about B to M at 25° C., the ratio of urea to —NH— groups being between 0.2:1 and 1.5:1, and reacting the resulting reaction product with formaldehyde to form a soluble resinous condensate in an amount sufficient so that at least 0.6 mol of formaldehyde is present for each hydrogen present on nitrogen in the condensation product.

8. The coating composition of claim 7 in which the dihaloalkane is ethylene dichloride and the polyethylenepolyamine is triethylenetetramine.

9. A cured resinous composition formed by reacting with heat an adhesive containing a reactive hydroxyl group comprising at least one member of the group consisting of a starch and a cellulose, an inorganic pigment and a water soluble cross-linking resinous composition produced by reacting a dihaloalkane of not over 3 carbon atoms, said halogen being a member of the group consisting of chlorine and bromine, with a polyethylenepolyamine having a molecular weight of at least 146, the mol ratio of dihaloalkane to polyethylenepolyamine being at least 0.7:1 and not exceeding 1.6:1 and being capable of yielding soluble condensation products, and continuing the reaction until a 60 to 65 percent aqueous solution of the condensation product has a Gardner-Holdt viscosity of N to $Z_3$ at 25° C., reacting the resulting condensation product by heating it with urea until a 50 percent aqueous solution of the resulting reaction product has a Gardner-Holdt viscosity of about B to M at 25° C., the ratio of urea to —NH— groups being between 0.2:1 and 1.5:1, and reacting the resulting reaction product with formaldehyde to form a soluble resinous condensate in an amount sufficient so that at least 0.6 mol of formaldehyde is present for each hydrogen present on nitrogen in the condensation product.

10. A planographic printing plate comprising a paper base having a coating composition thereon comprising an inorganic pigment and the reaction product of at least one member of the group consisting of starch containing reactive hydroxyl groups and cellulose containing reactive hydroxyl groups and a water soluble polyethylenepolyamine-dihaloalkane-urea-formaldehyde reaction product.

11. A planographic printing plate comprising a paper base and having a coating composition applied thereto comprising clay and the reaction product of an adhesive of at least one member of the group consisting of starch containing reactive hydroxyl groups and cellulose containing reactive hydroxyl groups, together with a water soluble triethylenetetramine - ethylene dichloride - urea - formaldehyde resin.

12. The planographic plate of claim 11 in which the adhesive is carboxymethyl cellulose.

13. The planographic plate of claim 11 in which the adhesive is amioca starch.

14. The planographic plate of claim 11 in which the adhesive is chlorinated starch.

15. A planographic printing plate comprising a paper base having a coating composition applied thereto comprising china clay and the reaction product of carboxymethyl cellulose and a water soluble resinous composition produced by reacting ethylene dichloride with triethylenetetramine, the mol ratio of the ethylene dichloride to the triethylenetetramine being at least 0.7:1 and not exceeding 1.6:1 and continuing the reaction until a 60 to 65 percent aqueous solution of the ethylene dichloride-triethylenetetramine reaction product has a Gardner-Holdt viscosity of N to $Z_3$ at 25° C., reacting the resulting product by heating it with urea until a 50 percent aqueous solution of the resulting reaction product with urea has a Gardner-Holdt viscosity of about B to M at 25° C., the ratio of urea to —NH— groups being between 0.2:1 and 1.5:1, and reacting the resulting product with formaldehyde to form a soluble resinous condensate in an amount sufficient so that at least 0.6 mol of formaldehyde is present for each hydrogen present on nitrogen in the product.

16. A planographic printing plate comprising a paper base having a cured resinous composition adhered thereto formed by reacting with heat an adhesive containing a reactive hydroxyl group comprising at least one member of the group consisting of a starch and a cellulose, an inorganic pigment and a water soluble cross-linking resinous composition produced by reacting a dihaloalkane of not over 3 carbon atoms, said halogen being a member of the group consisting of chlorine and bromine, with a polyethylenepolyamine having a molecular weight of at least 146, the mol ratio of dihaloalkane to polyethylenepolyamine being at least 0.7:1 and not exceeding 1.6:1 and being capable of yielding soluble condensation products, and continuing the reaction until a 60 to 65 percent aqueous solution of the condensation product has a Gardner-Holdt viscosity of N to $Z_3$ at 25° C., reacting the resulting condensation product by heating it with urea until a 50 percent aqueous solution of the resulting reaction product has a Gardner-Holdt viscosity of about B to M at 25° C., the ratio of urea to —NH— groups being between 0.2:1 and 1.5:1, and reacting the resulting reaction product with formaldehyde to form a soluble resinous condensate in an amount sufficient so that at least 0.6 mol of formaldehyde is present for each hydrogen present on nitrogen in the condensation product.

References Cited in the file of this patent

UNITED STATES PATENTS

| | | |
|---|---|---|
| 2,616,874 | Yost et al. | Nov. 4, 1952 |
| 2,655,101 | Newman | Oct. 13, 1953 |
| 2,724,665 | Oransky | Nov. 22, 1955 |